May 6, 1941.  V. G. GARNETT ET AL  2,241,193
DUAL WHEEL AND BRAKE CONSTRUCTION
Filed Dec. 23, 1938
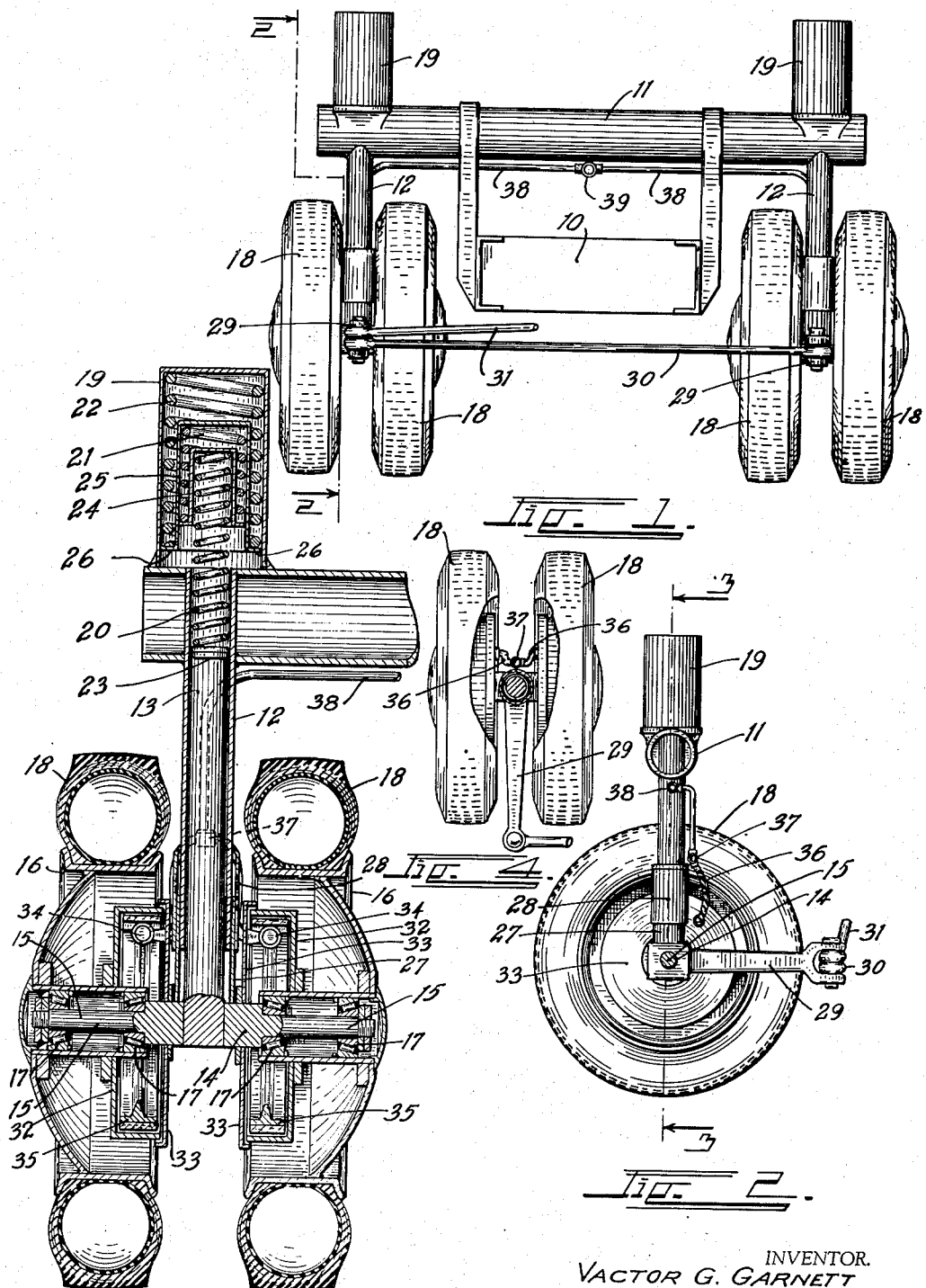
INVENTOR.
VACTOR G. GARNETT
EDWARD V. GARNETT
BY
ATTORNEY.

Patented May 6, 1941

2,241,193

UNITED STATES PATENT OFFICE 2,241,193

DUAL WHEEL AND BRAKE CONSTRUCTION

Vactor G. Garnett and Edward V. Garnett, Denver, Colo.

Application December 23, 1938, Serial No. 247,378

7 Claims. (Cl. 280—96.2)

This invention relates to a dual wheel mounting and to a dual wheel brake structure for heavy motor vehicles such as trucks, busses, etc.

The principal object of this invention is to provide a wheel mounting, more particularly a front wheel mounting, for dual wheels in which all bending strains, uneven wheel loadings, etc. encountered in the usual dual wheel cantilever axles are eliminated.

Another object of the invention is to establish a pivot between each pair of dual front wheels so that the load and the forward thrust will be equally distributed between the two wheels and so that very little effort will be required for turning and guiding the wheels.

A still further object is to provide a cushioning spring arrangement for the wheels of a type which will permit mounting between dual wheels and which will support the vehicle on a light spring when traveling with a light load or empty and upon increasingly heavier springs as the load thereon increases.

A still further object is to provide a braking arrangement for dual wheels which, when the brakes are applied, will not exert a turning action on the front wheel pivots but in which the retarding action on one wheel will be counteracted by the retarding action on the other wheel of each pair so that there will be no twisting or bending strain imposed upon the tie rod or other parts of the steering mechanism.

A still further object is to provide a dual front wheel mounting and brake structure which will inherently follow the road and eliminate all necessity for the usual camber, caster and "toe-in" of the wheels and in which all uneven tire wear is eliminated.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a front view of a typical truck structure with the invention applied thereto.

Fig. 2 is a vertical section taken on the line 2—2, Fig. 1.

Fig. 3 is an enlarged section taken on the line 3—3, Fig. 2.

Fig. 4 is a horizontal section through the wheel pivot member looking downwardly on the dual wheels.

The chassis or weight carrying portion of the truck is indicated in the drawing at 10. This invention contemplates placing a transverse beam 11 across the chassis 10 which projects beyond both sides thereof. The beam may have any desired cross section. A cylindrical tube, as illustrated, has been found very satisfactory.

Vertical tubes 12 extend downwardly from adjacent each extremity of the beam 11. A plunger post 13 is vertically slidable in each of the tubes 12 and projects downwardly below the lower extremity thereof. The plungers terminate in axle members 14, from which, wheel axles 15 oppositely project.

Each of the wheel axles 15 supports one wheel of a pair of dual wheels 16 upon suitable wheel bearings 17. The wheels 16 are, of course, provided with the usual tires 18. The axles 15 are in axial alignment with each other and are of equal length so that the wheels 16 are equally spaced from and parallel with the plunger 13.

An outer spring cup 19 is secured to the beam 11 immediately above each of the tubes 12, the latter passing completely through the beam 11. The weight on the beam 11 is transmitted to the plunger 13 through a plurality of springs of different strength. In the embodiment illustrated three springs are employed, a light spring 20, an intermediate spring 21 and a heavy spring 22.

The light spring 20 is compressed between a rotary thrust bearing member 23, on the upper extremity of the plunger 13, and the bottom of an inner, flanged, inverted spring cup 24. The intermediate spring 21 is compressed between the flange on the cup 24 and the bottom of an inverted, flanged, intermediate spring cup 25. The intermediate spring cup 25 is similar to the inner spring cup except for size and the heavy spring 22 is compressed between its peripheral flange, shown at 26, and the closed bottom of the fixed inverted spring cup 19. The latter is welded or otherwise secured to the beam 11.

It can be readily seen that if the truck is empty or lightly loaded, only the light spring 20 will function. If this load increases, the spring 20 will be compressed until a point is reached when its increasing reaction will begin to compress the intermediate spring. If the load is still further increased, the reaction of the intermediate spring will be transmitted to the heavier spring 22. Therefore, the spring strength of the chassis 10 is directly proportional to the load thereon so that the truck will be easy riding with light loads or empty as well as fully loaded.

To protect the lower extremity of the plunger 13 from mud, sand, and dirt, and to prevent the loss of lubricating grease, a pair of telescopic sleeves are employed. These sleeves comprise an inner sleeve 27, which is secured to the axle member 14, and which telescopically receives the lower extremity of the tube 12 and an outer sleeve 28, secured to the tube 12, which extends downwardly over the sleeve 27 in telescopic engagement therewith. It can be readily seen that the plunger 13 is completely sealed against the entrance of any foreign matter and all abrasion will occur in the sleeves 27 and 28 and not in the plunger.

While the above described wheel suspension is more particularly designed and more particularly valuable for use on the front wheels of vehicles, wherein the plunger 13 can act as the turning pivot, it can also be applied to the rear wheels by fixing the plunger against rotation.

For front wheel use, each of the axle members 14 carries a steering arm 29 which extends forwardly therefrom. The two steering arms are connected together by means of the usual steering tie rod 30. The turning movements of the steering gear are transmitted through a suitable steering rod 31. The steering gear itself may be of any of the usual types.

It can be readily seen that the road drag on the tires 18 is equal on both sides of the plunger 13 so that the reactive forces on the two wheels counteract each other. Therefore no strains are transmitted to the steering arms 29 or the tie rod 30 and as the wheels have no tendency to swerve in either direction, no caster, camber, or "toe-in" is necessary in the wheel axles, and they can be turned for steering purposes with a minimum of effort.

Front wheel braking on trucks has heretofore presented a difficult problem due to the fact that the steering pivots of each of the wheels do not coincide with the center lines of the wheels. When the brakes are applied, an excessive rearward bending moment is imposed on the front wheel axles and upon the connected steering mechanism resulting in frequent break downs. In order to minimize these bad features intricate adjustments of caster, camber, and "toe-in" are resorted to.

All of this has been avoided in the present construction by placing a brake upon each member of the pair of dual wheels, one at each side of the steering pivot so that the retarding action of one wheel is completely counteracted or counterbalanced by the reaction of the other wheel and the forward inertia is absorbed between the two so that even in the most abrupt stop, there is no tendency toward horizontal rotation and no strains are placed upon the steering apparatus; hence no caster, camber or "toe-in" are necessary.

In the embodiment illustrated, a brake drum 32 is positioned within each of the wheels 16 and secured thereto. A brake disc 33 is secured to the axle member 14 adjacent each of the drums 32. The discs 33 support the usual hydraulic cylinders 34 for actuating suitable brake shoes 35.

The cylinders 34 are connected by means of flexible tubes 36 to T-fittings 37 secured to the stationary tubes 12. A hydraulic conduit 38 leads from each T-fitting to a central pressure line 39. This arrangement applies the brake shoes of all wheels of the dual pairs simultaneously and with equal pressure so the reactance on both sides of each plunger is balanced.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A dual wheel mounting for a vehicle chassis comprising: a transverse beam extending across said chassis; a fixed tube extending downwardly from adjacent each extremity of said beam; a plunger extending upwardly within each tube and projecting below the lower extremity thereof; an axle member secured on the lower extremity of each plunger; wheel axles extending oppositely outward from each of said axle members; a wheel mounted on each of said wheel axles; an inverted fixed spring cup secured to said beam over the upper extremity of each of said tubes; and resilient means compressed between the bottoms of said spring cups and said plunger.

2. A dual wheel mounting for a vehicle chassis comprising: a transverse beam extending across said chassis; a fixed tube extending downwardly from adjacent each extremity of said beam; a plunger extending upwardly within each tube and projecting below the lower extremity thereof; an axle member secured on the lower extremity of each plunger; wheel axles extending oppositely outward from each of said axle members; a wheel mounted on each of said wheel axles; an inverted fixed spring cup secured to said beam over the upper extremity of each of said tubes; an inverted, inner spring cup within each of said fixed spring cups; a peripheral flange projecting from each of said inner spring cups; a first spring compressed between each of said plungers and the bottom of its inner cup; and spring means compressed between said inner cups and said fixed spring cups.

3. A dual wheel mounting for a vehicle chassis comprising: a transverse beam extending across said chassis; a fixed tube extending downwardly from adjacent each extremity of said beam; a plunger extending upwardly within each tube and projecting below the lower extremity thereof; an axle member secured on the lower extremity of each plunger; wheel axles extending oppositely outward from each of said axle members; a wheel mounted on each of said wheel axles; an inverted fixed spring cup secured to said beam over the upper extremity of each of said tubes; an inverted, inner spring cup within each of said fixed spring cups; a peripheral flange projecting from each of said inner spring cups; an intermediate inverted flanged spring cup surrounding and spaced from said inner cup; a first spring compressed between said inner cup and said plunger; a second spring compressed between said inner cup and said intermediate cup; and a third spring compressed between said intermediate cup and said fixed cup.

4. A dual wheel mounting for a vehicle chassis comprising: a transverse beam extending across said chassis; a fixed tube extending downwardly from adjacent each extremity of said beam; a plunger extending upwardly within each tube and projecting below the lower extremity thereof; an axle member fixedly secured on the lower extremity of each plunger; wheel axles extending oppositely outward from each of said axle members at fixed angles to the axis of said plunger; a wheel mounted on each of said wheel axles; spring means positioned above said beam for resisting downward movement of said tubes on said plunger; resilient means for transmitting the thrust of said plunger to said spring means; and means for rotating said plunger to steer said vehicle.

5. A dual wheel mounting for a vehicle chassis comprising: a transverse beam extending across said chassis; a fixed tube extending downwardly from adjacent each extremity of said beam; a plunger extending upwardly within each tube and projecting below the lower extremity thereof; wheel axles extending oppositely outward from each of said plungers at fixed right angles to the axis thereof; a wheel mounted on each of said wheel axles; spring means resisting downward movement of said tubes on said plunger, said spring means including a spring located above said beam.

6. A dual wheel mounting for a vehicle chassis comprising: a transverse beam extending across said chassis; a fixed tube extending through and downwardly from adjacent each extremity of said beam; a plunger extending upwardly within each tube and projecting below the lower extremity thereof; an axle member secured on the lower extremity of each plunger; wheel axles extending oppositely outward from each of said axle members; a wheel mounted on each of said wheel axles; spring retaining means secured to said beam over the upper extremity of each of said tubes; springs supported by said retaining means over said beam; and resilient means for transmitting the thrust of said plunger through said fixed tube to said springs.

7. A dual wheel mounting for a vehicle chassis comprising: a transverse beam extending across said chassis; a fixed tube extending downwardly from adjacent each extremity of said beam; a plunger extending upwardly within each tube and projecting below the lower extremity thereof; an axle member secured on the lower extremity of each plunger; wheel axles extending oppositely outward from each axle member; a wheel mounted on each wheel axle; means for positioning a spring on said beam over the upper extremity of each of said tubes and resilient means compressed between the positioning means and said plungers to cushion the latter.

EDWARD V. GARNETT.
VACTOR G. GARNETT.